(12) United States Patent
Kim et al.

(10) Patent No.: US 11,741,799 B2
(45) Date of Patent: Aug. 29, 2023

(54) CURVED HAPTIC ACTUATOR AND WEARABLE DEVICE COMPRISING SAME

(71) Applicant: CK MATERIALS LAB CO., LTD., Seoul (KR)

(72) Inventors: Hyeong Jun Kim, Seoul (KR); Myung Sun Park, Seoul (KR); Jong Hun Lee, Seoul (KR); Cheol Hee Lee, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 10 days.

(21) Appl. No.: 17/403,879

(22) Filed: Aug. 17, 2021

(65) Prior Publication Data

US 2021/0383660 A1  Dec. 9, 2021

Related U.S. Application Data

(62) Division of application No. 16/754,859, filed as application No. PCT/KR2017/013387 on Nov. 23, 2017, now Pat. No. 11,403,922.

(51) Int. Cl.
| | |
|---|---|
| *G08B 6/00* | (2006.01) |
| *G06F 3/01* | (2006.01) |
| *H01F 1/147* | (2006.01) |
| *H01F 41/12* | (2006.01) |
| *G06F 1/16* | (2006.01) |

(52) U.S. Cl.
CPC .............. *G08B 6/00* (2013.01); *G06F 3/016* (2013.01); *H01F 1/14708* (2013.01); *H01F 41/125* (2013.01); *G06F 1/163* (2013.01)

(58) Field of Classification Search
CPC . G08B 6/00; G06F 3/016; G06F 1/163; H01F 1/14708; H01F 41/125
See application file for complete search history.

(56) References Cited

U.S. PATENT DOCUMENTS

| | | |
|---|---|---|
| 10,032,550 B1 | 7/2018 | Zhang et al. |
| 10,564,724 B1 | 2/2020 | Bergeron et al. |
| (Continued) | | |

FOREIGN PATENT DOCUMENTS

| | | |
|---|---|---|
| KR | 10-2008-0021663 A | 3/2008 |
| KR | 10-1432013 B1 | 8/2014 |
| (Continued) | | |

OTHER PUBLICATIONS

Ravinder S. Dahiya et al., "Tactile Sensing-From Humans to Humanoids", IEEE Transactions on Robotice, Feb. 2010, pp. 1-20, vol. 26, No. 1.

*Primary Examiner* — Hongmin Fan
(74) *Attorney, Agent, or Firm* — NKL Law; Jae Youn Kim

(57) ABSTRACT

A curved haptic actuator according to an embodiment may comprise: a housing having a receiving space and having a shape where the receiving space and an outer appearance thereof are bent outward; a vibration unit disposed in the receiving space, being movable along the longitudinal direction of the housing, and having a shape bent upward; elastic bodies connected to an inner wall of the housing and both sides of the vibration unit; and a magnetic field generation unit which is installed on the inner wall of the housing and generates a magnetic field and applies the magnetic field to the vibration unit.

13 Claims, 11 Drawing Sheets

(56) References Cited

U.S. PATENT DOCUMENTS

| | | | | |
|---|---|---|---|---|
| 2011/0133577 | A1* | 6/2011 | Lee | H02K 33/18 |
| | | | | 310/15 |
| 2013/0293494 | A1* | 11/2013 | Reshef | G06F 3/041 |
| | | | | 345/173 |
| 2015/0154853 | A1* | 6/2015 | Yousef | G06F 3/016 |
| | | | | 340/539.11 |
| 2015/0156581 | A1* | 6/2015 | Efrati | H04R 9/066 |
| | | | | 381/98 |

FOREIGN PATENT DOCUMENTS

| | | |
|---|---|---|
| KR | 10-1461274 B1 | 11/2014 |
| KR | 10-1478992 B1 | 1/2015 |
| KR | 10-2016-0021160 A | 2/2016 |
| KR | 10-1728816 B1 | 5/2017 |
| KR | 10-2017-0097576 A | 8/2017 |

\* cited by examiner

CURVED HAPTIC ACTUATOR AND WEARABLE DEVICE COMPRISING SAME

CROSS-REFERENCE TO RELATED APPLICATIONS

This application is a Division of U.S. application Ser. No. 16/754,859, field Apr. 9, 2020, which claims the priority of National Stage of International patent application PCT/KR2017/013387, filed on Nov. 23, 2017, which claims priority of foreign Korean patent application No. KR 10-2017-0130113, filed on Oct. 11, 2017 and KR 10-2017-0154269, filed on Nov. 17, 2017, the disclosures of which are incorporated by reference in their entirety.

TECHNICAL FIELD

The following description relates to a curved haptic actuator and a wearable device including the same.

BACKGROUND ART

Haptics is a technology associated with a tactile sensation, and specifically refers to a technology that allows a user of an electronic device to perceive the tactile sensation, a force, a sense of movement, and the like through a keyboard, a mouse, a joystick, a touch screen, and the like. In the past, visual or auditory means were mainly used when the electronic device and a human exchange information. However, in recent years, a haptic technology has attracted attention for more specific and realistic information delivery.

Generally, a linear resonant actuator (LRA) has been mainly used as a haptic providing device. This is a method for maximizing a vibration intensity using a resonant frequency generated by a weight body connected to an elastic spring and a magnetic circuit.

Such linear resonant actuator includes a housing, which is a member for forming an outer shape, composed of upper and lower portions, a vibrator including a magnet and a yoke structured weight body, each elastic portion positioned on each of top and bottom surfaces as a spring for supporting the vibrator, and a coil for generating an electromagnetic force.

There are Korean Patent No. 10-1461274 (name: linear motor) and Korean Patent Application Publication No. 10-2016-0021160 (name: spring and linear vibration motor therewith) for the linear resonant actuator of the haptic providing device, that is the conventional technology. However, these actuators are very bulky and have difficulty meeting specific space limitations.

The conventional linear resonant actuator has a disadvantage that an effective vibration is possible only when using a resonant frequency determined by a mass body and a spring for a purpose of transmitting a simple vibration.

In addition, based on a 2010 article (title: Tactile sensing—from humans to humanoids) published in the international journal IEEE TRANSACTIONS ON ROBOTICS, a frequency range of the tactile sensation acceptable to a human body is from 0.4 Hz to 500 Hz or greater. However, when using the conventional haptic technology, because only a simple vibration in a frequency band equal to or greater than 160 Hz is provided, more various and complex information is not able to be delivered. Thus, in order to effectively solve this, it is necessary to study a device that may effectively transmit tactile signals within various frequency ranges.

Thus, there is a need for study on a device that may have one resonant frequency in a region equal to or less than 170 Hz, and may provide a new tactile sensation represented as a vibration in a left and right direction through electrical signals of different input waveforms in a low frequency band.

In addition, there is a need for study on a tactile sensation delivery structure of a thin and curved structure that may be driven even at a small voltage may be used in a curved structure, and may deliver information in various tactile sensation patterns in addition to the simple vibration.

The background art described above is possessed or acquired by the inventor in the derivation of the present invention, which is not necessarily a known technique disclosed to the public before the application of the present invention.

DISCLOSURE OF INVENTION

Technical Subject

One purpose of an example embodiment is to provide a curved haptic actuator that has a curved shape, has at least one resonant frequency, and converts different input waveforms into electrical signals in a low frequency (20 Hz or below) band to provide different tactile sensations by an external magnetic force.

Another purpose of an example embodiment is to provide a curved haptic actuator that is mounted not only inside but also outside of a VR glove, a game controller, a smart clothes, and the like in an IT field to directly hit a user's skin, thereby enabling local tactile sensation and real-time tactile sensation transmission.

Another purpose of an example embodiment is to provide a wearable device that is worn on a curved body of a user to transmit various tactile signals.

Technical Solution

According to an aspect of the present invention, there is provided a curved haptic actuator including a housing having a receiving space defined in the housing, wherein the receiving space and an outer shape of the housing are curved outwardly, a vibrator disposed in the receiving space and movable along a longitudinal direction of the housing, wherein the vibrator has an upwardly curved shape, each elastic body connected between each of both side surfaces of the vibrator and an inner wall of the housing, and a magnetic field generator installed on the inner wall of the housing and generating a magnetic field and applying the generated magnetic field to the vibrator.

The vibrator may include a mass body forming an outer shape of the vibrator, and a plurality of magnetic bodies arranged on the mass body to be spaced apart from each other along the longitudinal direction of the housing.

The magnetic field generator may include an upwardly curved substrate, and a plurality of coils arranged in the substrate to be spaced apart from each other along the longitudinal direction of the housing.

The curved haptic actuator may further include a controller that moves the vibrator along the longitudinal direction of the housing by generating magnetic fields in opposite directions respectively to a pair of coils adjacent to the magnetic body when no current is applied to the magnetic field generator.

A center of the magnetic body may be positioned between the pair of coils.

The magnetic field generator may be a flexible printed circuit board.

The housing, the vibrator, and the magnetic field generator may be curved in a set curvature.

A value of the set curvature may be 0.01 to 0.066.

A distance between each of the both side surfaces of the vibrator and each of left and right side faces of the receiving space may be 1.5 mm to 2 mm.

At least a portion of the elastic body may be bent.

The elastic body may be formed in one of a 'V' shape, an 'N' shape, and a rhombus shape.

A width of the elastic body in an up and down direction may be 4 mm to 10 mm.

The curved haptic actuator may further include each damper installed on each of the both side surfaces of the vibrator or on the inner wall at each of both sides of the receiving space to prevent contact between the vibrator and the housing.

The damper may contain magnetic fluid.

The controller may determine a characteristic of a current to be applied to the coil based on one of a plurality of preset driving modes, wherein the plurality of driving modes may include a general vibration mode and a tapping mode, wherein the controller may apply a sine wave having a frequency between 80 Hz and 250 Hz to the coil when the driving mode is the general vibration mode, and apply a sine wave or a square-wave having a frequency of 1 Hz or more and 15 Hz or less to the coil when the driving mode is the tapping mode.

According to another aspect of the present invention, there is provided a wearable device including a main body, a strap connected to the main body and having an at least partially curved shape, and a first curved haptic actuator installed in a curved portion of the strap, wherein the first curved haptic actuator includes first vibrator movable along a longitudinal direction of the strap and having a curved shape, and a first magnetic field generator for generating a magnetic field to be applied to the first vibrator.

The wearable device may further include a second curved haptic actuator installed in the curved portion of the strap, wherein the second curved haptic actuator includes a second vibrator movable along the longitudinal direction of the strap and having a curved shape, a second magnetic field generator for generating a magnetic field to be applied to the second vibrator.

The second curved haptic actuator may have a shape and disposition symmetrical to the first curved haptic actuator with respect to the main body.

The wearable device may further include a controller that respectively applies voltages having the same magnitude and the same direction to the first curved haptic actuator and the second curved haptic actuator.

Technical Effect

According to the curved haptic actuator according to an example embodiment, the tactile sensations including the vibrations may be provided in a wide band.

According to the curved haptic actuator according to an example embodiment, the tactile sensations may be provided to an entirety or a portion of the electronic device, and the tactile sensations such as the 'tapping' in addition to the vibration may be provided to the user by controlling the intensity of the voltage or the frequency.

According to the curved haptic actuator according to an example embodiment, because of the curved structure, the curved haptic actuator may be installed in various devices having curved-surface shapes.

According to the curved haptic actuator according to an example embodiment, the curved haptic actuator may be applied to wearable devices such as a smart strap, and the like, a VR device, a vehicle steering, or a jog dial.

According to the wearable device according to an example embodiment, because the direction of the motion is formed in the longitudinal direction of the strap, the vibration may be transmitted along an entirety of the wearable device.

BEST MODE FOR CARRYING OUT THE INVENTION

Figure 1:
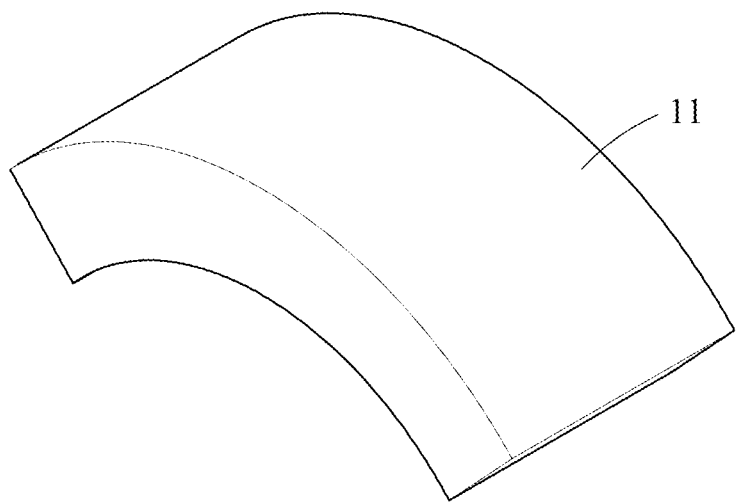
FIG. 1 is a perspective view illustrating a curved haptic actuator according to one example embodiment.

This application claims the benefit of priority to Korean Patent Application No. 10-2017-0130113, filed on Oct. 11, 2017, in the Korean Intellectual Property Office, the entire contents of which are incorporated herein by reference.

Hereinafter, some example embodiments of the present invention will be described in detail with reference to the exemplary drawings. In adding the reference numerals to the components of each drawing, it should be noted that the identical or equivalent component is designated by the identical numeral even when they are displayed on other drawings. Further, in describing the example embodiment of the present invention, a detailed description of the related known configuration or function will be omitted when it is determined that it interferes with the understanding of the example embodiment of the present invention.

In describing the components of the example embodiment according to the present invention, terms such as first, second, A, B, (a), (b), and the like may be used. These terms are merely intended to distinguish the components from other components, and the terms do not limit the nature, order or sequence of the components. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
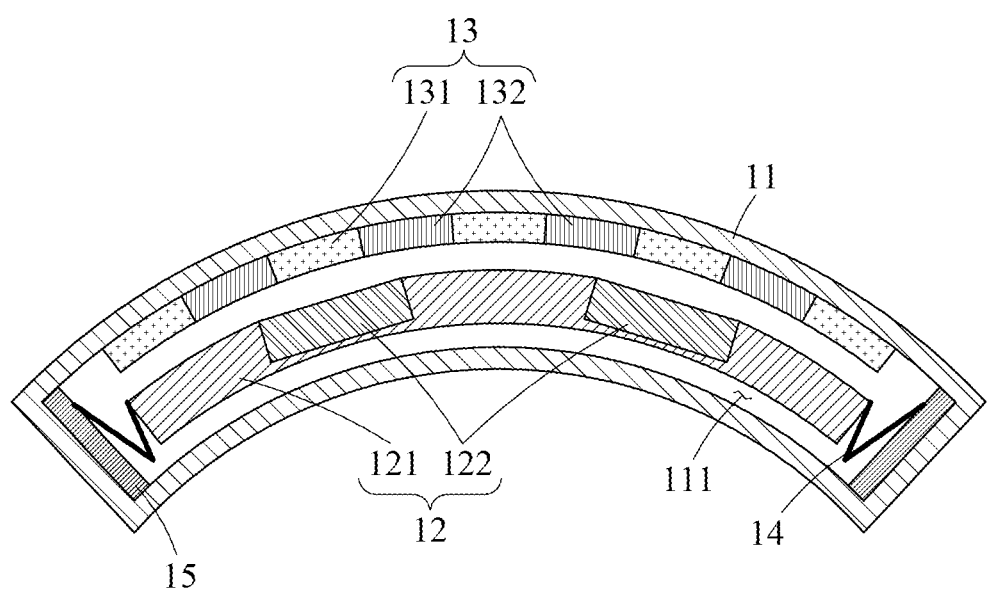
FIG. 2 is a cross-sectional view illustrating a curved haptic actuator according to one example embodiment.
Figure 3:
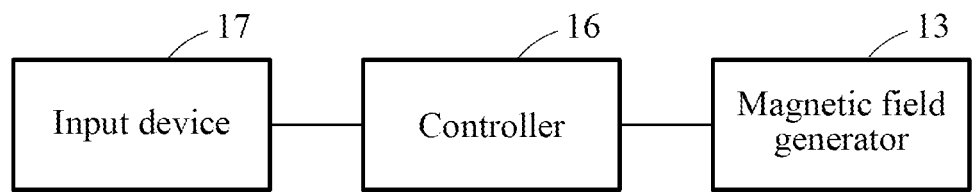
FIG. 3 is a block diagram of a curved haptic actuator according to one example embodiment.
Figure 4:
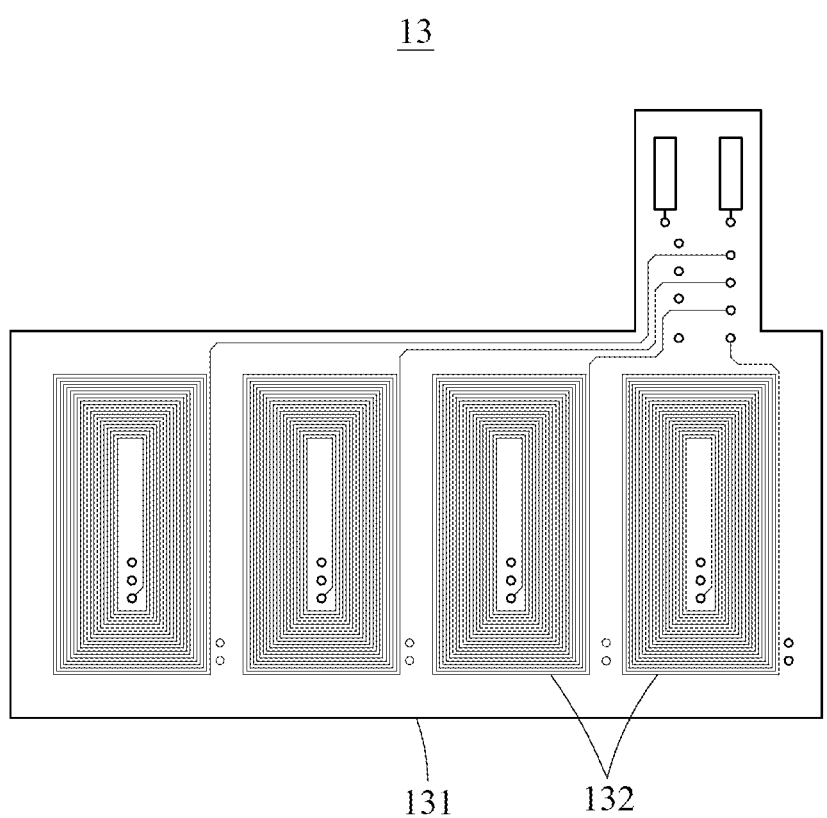
FIG. 4 is a diagram illustrating a magnetic field generator according to one example embodiment.

FIG. 1 is a perspective view illustrating a curved haptic actuator according to one example embodiment. Further, FIG. 2 is a cross-sectional view illustrating a curved haptic actuator according to one example embodiment. Further, FIG. 3 is a block diagram of a curved haptic actuator according to one example embodiment. Further, FIG. 4 is a diagram illustrating a magnetic field generator according to one example embodiment.

Referring to FIGS. 1 to 4, a curved haptic actuator 1 according to an example embodiment may include a housing 11, a vibrator 12, an elastic body 14, a magnetic field generator 13, a damper 15, a controller 16, and an input device 17.

The housing 11 may be a member surrounding an outer surface of the curved haptic actuator 1. For example, the housing 11 may be curved to one side. For example, the housing 11 may have a shape curved upward as shown in FIG. 1.

For example, the housing 11 may include a receiving space 111 defined therein.

The receiving space 111 may have a shape curved upward as the housing 11 is formed to be curved to one side. For example, the vibrator 12, the elastic body 14, the magnetic field generator 13, and the damper 15 may be arranged in the receiving space 111.

For example, the housing 11 may prevent a magnetic field generated in the magnetic field generator 13 disposed in the receiving space 111 from being transmitted to outside, and reversely, may prevent a magnetic field applied from the outside from affecting the vibrator 12 positioned inside the receiving space 111. For example, a top surface, a bottom surface, and a side surface of the housing 11 may be separated from each other for ease of installation and disassembly.

The vibrator 12 may be disposed in the receiving space 111 of the housing 11 and move. For example, the vibrator 12 may include a mass body 121 and a magnetic body 122.

The mass body 121 may be a member that forms an outer shape of the vibrator 12. For example, the mass body 121 may have a shape curved in the same direction as the housing 11 is curved. For example, the mass body 121 may have a curved shape having the same curvature as a curvature of the curved housing 11 and receiving space 111.

For example, the housing 11 and the vibrator 12 may have the same 'set curvature'. For example, the set curvature may be 0.01 to 0.066.

Based on the structure that has the same set curvature, the mass body 121 may have a constant spacing from an inner wall above or below the curved receiving space 111, and accordingly, the vibrator 12 may be disposed compactly in the receiving space 111.

The magnetic body 122 may be installed on the mass body 121, and may be made of a material having a magnetic property. For example, the magnetic body 122 may include a plurality of magnetic bodies. In this case, the magnetic bodies may be arranged on the mass body 121 to be spaced apart from each other at regular spacings in a longitudinal direction of the housing 11, that is, a left and right direction in FIG. 2.

For example, the magnetic body 122 may use a magnetized material such that a north pole and a south pole may be distinguished in a up/down or the left/right direction.

For example, a portion of the magnetic body 122 may contain soft magnetic materials having an intrinsic coercivity of equal to or below 1000 A/m among ferromagnetic materials.

For example, the magnetic body 122 is made of the soft magnetic material, and may contain steel, powders, an alloy, alloy powders, a composite, and a nanostructure containing at least one of elements such as iron (Fe), nickel (Ni), silicon (Si), manganese (Mn), zinc (Zn), and the like.

For example, a portion of the magnetic body 122 may contain copper (Cu) and tungsten (W) having a specific gravity of at least 8 among paramagnetic materials.

For example, a portion of the magnetic body 122 may use a material having steel, powders, an alloy, alloy powders, composites, a nanostructure, and the like containing at least one of elements of iron (Fe), cobalt (Co), nickel (Ni), neodymium (Nd), nickel (Ni), boron (B), zinc (Zn), and the like as the ferromagnetic materials.

Each elastic body 14 may be connected between each of both side surfaces of the vibrator 12 and the inner wall of the housing 11. For example, each elastic body 14 may be connected to each of the both side surfaces of the mass body 121 and each of both side surfaces of the inner wall of the housing 11 as shown in FIG. 2.

For example, the elastic body 14 may have a shape in which at least a portion is curved. For example, the elastic body 14 may be formed in one of a 'V' shape, an 'N' shape, and a rhombus shape.

The magnetic field generator 13 may be installed on the inner wall of the housing 11, and may generate the magnetic field and apply the magnetic field to the vibrator 12. For example, the magnetic field generator 13 may be installed on the inner wall above or below the receiving space 111 of the housing 11. It is noted that FIG. 2 exemplarily illustrates a case in which the magnetic field generator 13 is installed above the receiving space 111 of the housing 11, but the magnetic field generator 13 is not necessarily limited thereto.

For example, the magnetic field generator 13 may be a flexible printed circuit board, as shown in FIG. 4.

For example, the magnetic field generator 13 may include a substrate 131 and a coil 132.

The substrate 131 may form an outer shape of the magnetic field generator 13. For example, the substrate 131 may have a shape curved to one side, and may have a shape curved upwards as shown in FIG. 2.

For example, the substrate 131 curved upwards may be installed such that the curved shape of the substrate 131 is matched with the curved shape of the inner wall above and/or below the receiving space of the housing 11 curved upwards. For example, the housing 11, the vibrator 12, and the substrate 131 may be curved to have the same set curvature.

For example, when the magnetic field generator 13 is the flexible printed circuit board, the substrate 131 may be an insulating film that may be curved.

The coil 132 may be a conductor that is installed inside the substrate 131 to generate the magnetic field. For example, the coil 132 may be a planar coil having a polygonal shape, such as a circle, an oval, or a square shape, in the substrate 131. For example, the coil 132 may be a solenoid coil. For example, when the magnetic field generator 13 is the flexible printed circuit board, the coil 132 may be a copper foil printed on the substrate 131.

For example, the coil 132 may include a plurality of coils, and the coils may be arranged on the substrate 131 to be spaced apart from each other along the longitudinal direction of the housing 11.

For example, when the magnetic body 122 is polarized in the up and down direction and magnetized, a pair of coils 132 respectively applying magnetic fields to each magnetic body 122 may be arranged to be respectively adjacent to left and right sides of each magnetic body 122 as shown in FIG. 2.

For example, a center of the magnetic body 122 may be positioned between an adjacent pair of coils 132 based on a neutral state in which no external force is applied, as shown in FIG. 2.

Based on the above structure, in a state in which no current is applied to the magnetic field generator 13, the vibrator 12 may be moved along the longitudinal direction of the housing 11 by generating magnetic fields in opposite directions respectively to the pair of coils 132 adjacent to the magnetic body 122.

For example, when the magnetic field generator 13 is the flexible printed circuit board, the magnetic field generator 13 may be formed by being stacked in a plurality of layers. For example, the coils 132 may be formed on both surfaces of the substrate 131.

Each damper 15 may be installed on each of the both side surfaces of the vibrator 12 or on the inner wall at each of both sides of the receiving space 111 to prevent contact between the vibrator 12 and the housing 11. For example, as shown in FIG. 2, each damper 15 may be installed on the inner wall at each of the both sides of the receiving space 111 to prevent the vibrator 12 from being in contact with the inner wall of the housing 11 as the vibrator 12 moves in the longitudinal direction of the housing 11.

For example, the damper 15 may be a cushion to mitigate an impact when the vibrator 12 is in contact with the damper 15. For example, the damper 15 may include magnetic fluid whose physical property may be changed by the magnetic field.

The controller 16 may apply a voltage to the magnetic field generator 13. For example, the controller 16 may move the vibrator 12 by generating the magnetic fields in the opposite directions respectively to the pair of coils 132 adjacent to the magnetic body 122.

For example, the controller 16 may determine characteristics of a current, a voltage, and a frequency to be applied to the coil 132 based on one of a plurality of preset driving modes. For example, the driving modes may include a general vibration mode and a tapping mode.

The general vibration mode, which is a mode in which an amplitude of a vibration force of the vibrator changes constantly, may be used as notification means when a specific event occurs to a user of a wearable device in which the curved haptic actuator 1 is used.

In the tapping mode, the amplitude of the vibration force of the vibrator may change intermittently as will be described later, so that the user may perceive a tactile sensation like intermittent tapping unlike a general vibration. Therefore, when another event that is distinguished from the general vibration occurs, the tapping mode may be used as the notification means.

The input device 17 may be an interface capable of receiving an input signal from the user or from the outside. For example, the characteristics of the current, the voltage, and the frequency applied to the magnetic field generator 13 may be selected through the input device 17. For example, the driving mode may be selected through the input device 17.

FIGS. 5A to 5D are diagrams illustrating elastic bodies according to example embodiments.

Referring to FIGS. 5A to 5D, elastic bodies formed in various shapes may be identified.

Figure 5A:
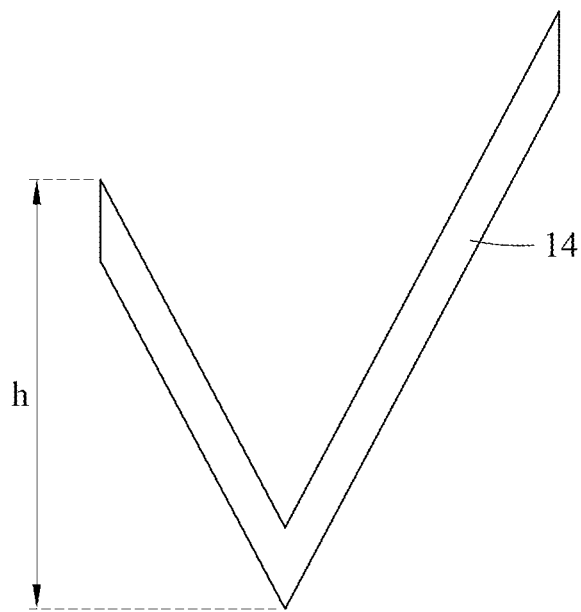
FIGS. 5A to 5D are diagrams illustrating elastic bodies according to example embodiments.

The elastic body 14 illustrated in FIG. 5A may have a 'V' shape. For example, the elastic body 14 may have a shape in which one end is formed longer than the other end. For example, the elastic body 14 may have a shape bent on the same plane. In contrast, the elastic body 14 may have a bent portion twisted about 1 degree.

As shown in FIG. 5A, a height from a bottom of the elastic body 14 to one end of the elastic body 14 may be referred to as a 'foot length h' of the elastic body 14.

Figure 5B:
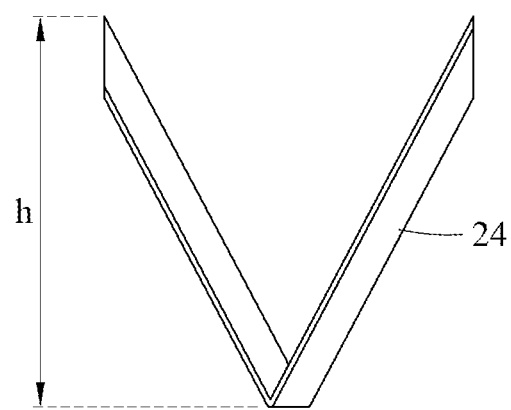

An elastic body 24 illustrated in FIG. 5B may have a 'V' shape in which lengths of one end and the other end are the same. In other words, foot lengths h of both ends of the elastic body 24 may be the same. For example, the elastic body 24 may have a bent portion twisted about 1 degree along the longitudinal direction of the elastic body.

Figure 5C:
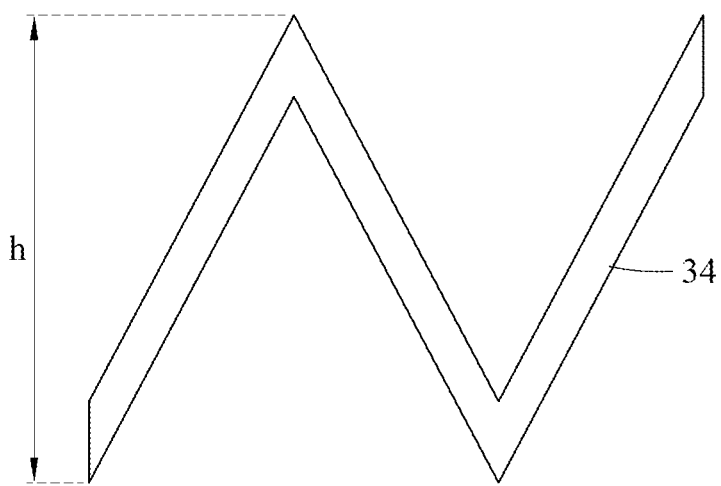

An elastic body 34 illustrated in FIG. 5C may have an 'N' shape. For example, as shown in FIG. 5C, when portions divided by bent points are respectively referred to as a first portion, a second portion, and a third portion, foot lengths h of the first to third portions may be the same.

Figure 5D:
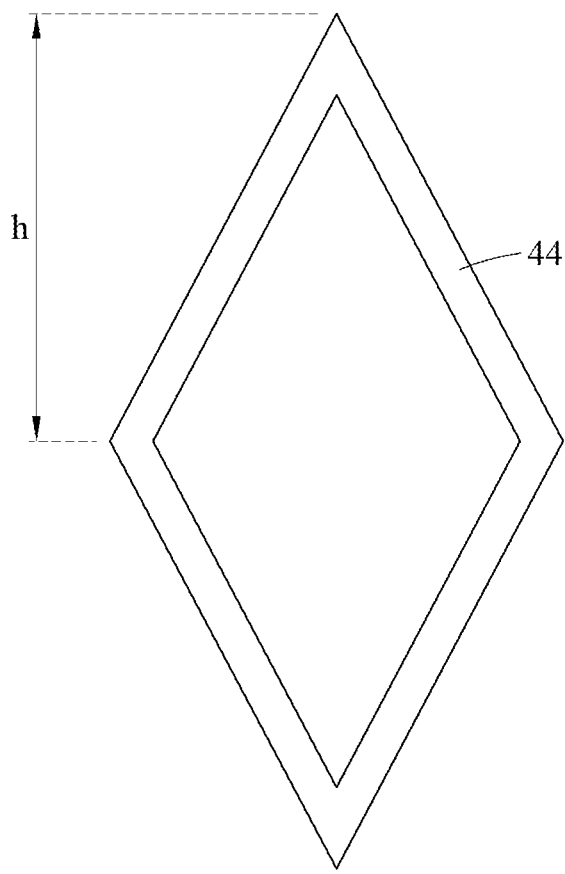

An elastic body 44 illustrated in FIG. 5D may have a rhombus or a diamond shape. For example, the elastic body 44 may be formed by connecting two elastic bodies of the 'V' shape with each other, and may have a form symmetric in the up and down direction.

For example, as shown in FIG. 5D, it may be understood that the elastic body 44 has a structure in which four portions having the same foot length h are connected with each other.

Figure 6:
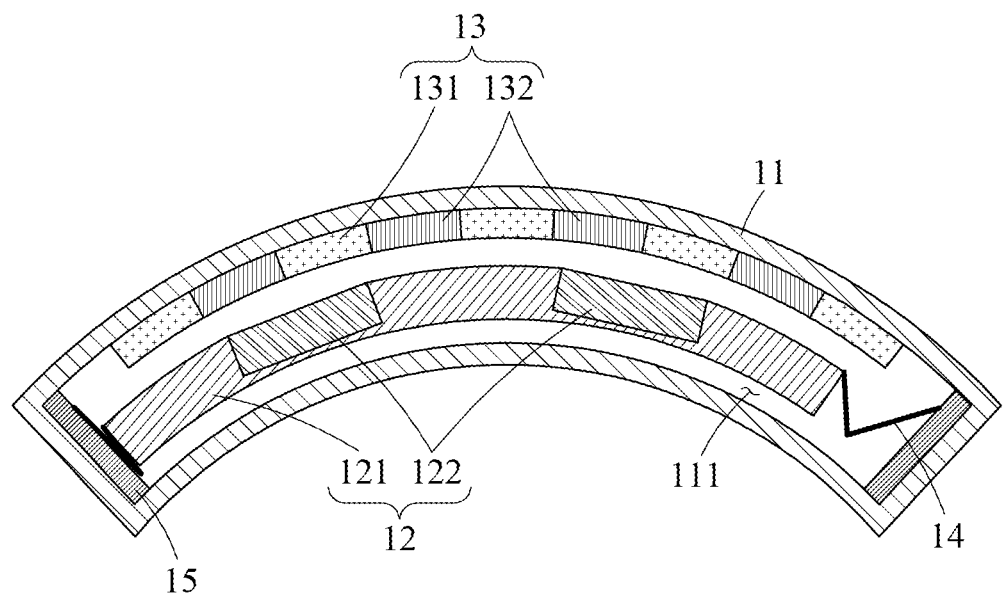
FIGS. 6 and 7 are cross-sectional views illustrating states in which a curved haptic actuator according to one example embodiment operates.
Figure 7:
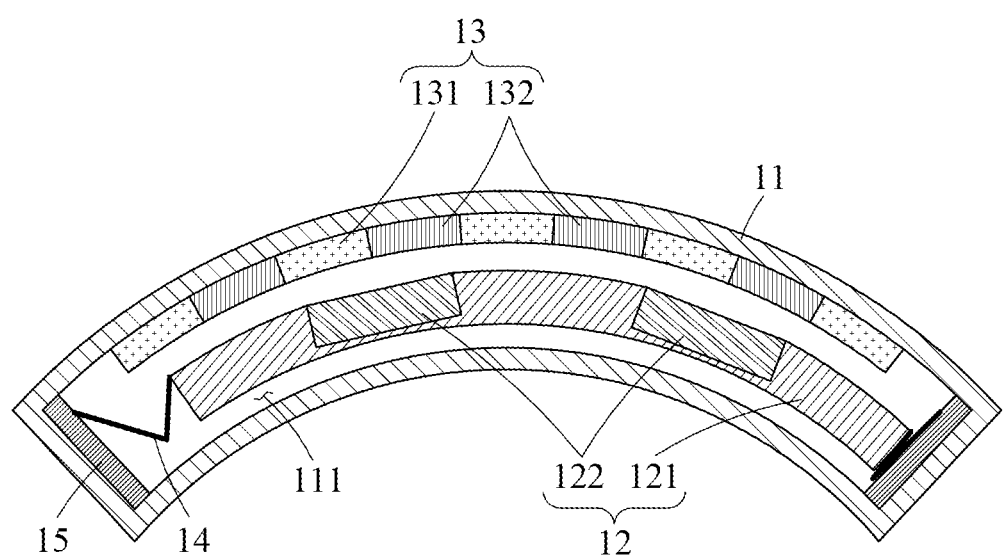

FIG. 6 is a cross-sectional view illustrating a state in which a curved haptic actuator according to one example embodiment operates, and FIG. 7 is a cross-sectional view illustrating a state in which a curved haptic actuator according to one example embodiment operates.

Referring to FIGS. 6 and 7, it may be seen that the vibrator 12 of the curved haptic actuator 1 according to an example embodiment moves in the longitudinal direction of the housing 11.

For example, the magnetic body 122 of the vibrator 12 may be magnetized to be polarized in the up and down direction, and the controller 16 may apply the currents to the coils 132 arranged to be adjacent to the left and right sides of the magnetic body 122 such that the coils 132 have different magnetic properties.

In this case, each coil 132 positioned on the left side of each magnetic body 122 among the coils 132 illustrated in FIG. 6 may form an attractive force with respect to each magnetic body 122, and each coil 132 positioned on the right side of each magnetic body 122 may form a repulsive force with respect to each magnetic body 122.

Accordingly, the vibrator 12 may perform a movement of moving to a left direction in the receiving space 111.

Thereafter, as shown in FIG. 7, currents in the opposite direction are respectively applied to the pair of coils 132, so that directions of magnetic forces of the pair of coils may be reversed. Specifically, each coil 132 positioned on the left side of each magnetic body 122 among the coils 132 may form the repulsive force with respect to each magnetic body 122, and each coil 132 positioned on the right side of each magnetic body 122 may form the attractive force with respect to each magnetic body 122.

Accordingly, the movement of the vibrator 12 may be converted into a movement of moving from a left side to a right side of the receiving space 111. As the above processes are repeated, a reciprocating motion of the vibrator 12 in the longitudinal direction of the housing 11 may be implemented.

The controller 16 may implement the reciprocating motion of the vibrator 12 by applying an alternating current to the pair of coils 132. For example, the controller 16 may generate a maximum vibration force by applying an alternating current having a resonant frequency corresponding to a natural frequency of the vibrator 12.

The controller 16 controls at least one of a direction of the current, an intensity of the voltage, or the frequency applied to the coil 132, so that the curved haptic actuator 1 may generate a tactile signal such as the tapping and the like as well as the general vibration.

Depending on the driving mode, the frequency and/or a waveform applied to the coil 132 may vary.

For example, when the driving mode is the general vibration mode, the controller 16 may apply a sine wave having a frequency between 80 Hz and 250 Hz to the coil.

For example, when the driving mode is the tapping mode, the controller 16 may apply a sine wave or a square-wave having a frequency lower than that in the general vibration mode, for example, 1 Hz or more and 15 Hz or less, to the coil 132.

Figure 8:
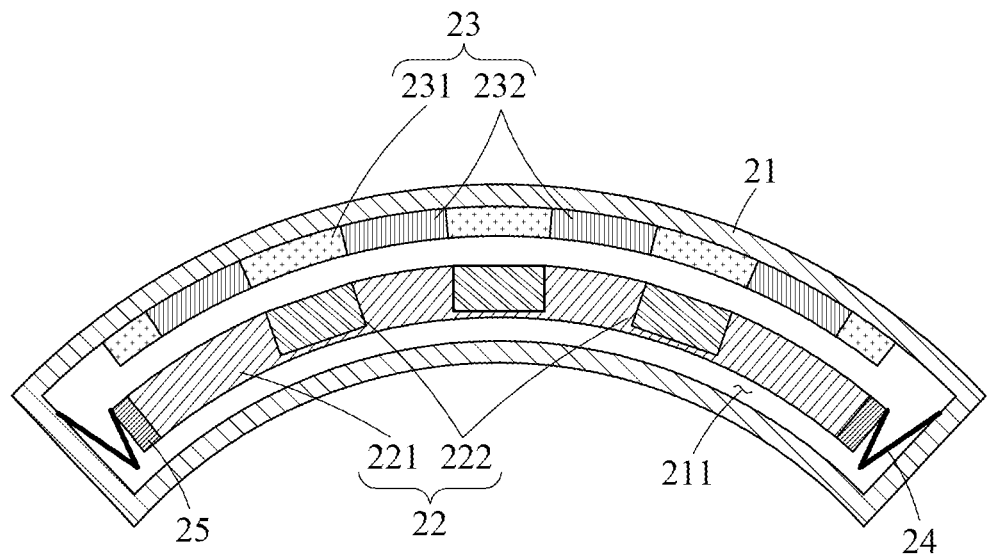
FIG. 8 is a cross-sectional view illustrating a curved haptic actuator according to one example embodiment.

FIG. 8 is a cross-sectional view illustrating a curved haptic actuator according to one example embodiment.

Referring to FIG. 8, it may be seen a configuration of a curved haptic actuator 2 according to another example embodiment different from the curved haptic actuator 1 illustrated in FIGS. 1 to 7.

The haptic actuator 2 according to an example embodiment may include a housing 21, a vibrator 22, a damper 25, the elastic body 24, a magnetic field generator 23, and the controller 16. The housing 21 may include a receiving space 211 defined therein, and the housing 21 and the receiving space 211 may have a shape curved to one side. The vibrator 22 may include a mass body 221 and a magnetic body 222.

The magnetic body 222 may include a plurality of magnetic bodies arranged on the mass body 221 to be spaced apart from each other along a longitudinal direction of the housing 21. For example, the magnetic body 222 may be magnetized to be polarized in the left and right along the longitudinal direction of the housing 21.

Each damper 25 may be installed on each of both side surfaces of the vibrator 22, that is, each of left and right side surfaces of the vibrator 22 directed in the longitudinal direction of the housing 21. For example, the damper 25 may be a cushion including a spring, a sponge, a cotton, and the like to mitigate an impact when the vibrator 22 is in contact with the damper 25. For example, the damper 25 may include magnetic fluid.

The magnetic field generator 23 may include a substrate 231 and a coil 232.

For example, when the magnetic body 222 is polarized in the longitudinal direction of the housing 11, that is, the left and right direction, the coils 232 applying magnetic fields to one mass body 221 may be arranged to be adjacent to left and right sides of one mass body 221 as shown in FIG. 8. In other words, a center of each magnetic body 222 may be positioned in one-to-one correspondence in each position between the two adjacent coils 232. In one example, although the magnetic body 222 is shown to be positioned in a central portion of the vibrator 22, the magnetic bodies 222 may be additionally arranged at both ends of the vibrator 22. In other words, the number of magnetic bodies 222 may be equal to or greater than the number of coils 232. For example, a center of the coil 232 may be positioned in one-to-one correspondence in each position between the two adjacent magnetic bodies 222.

The controller 16 may apply a voltage to the magnetic field generator 23. For example, the controller 16 may form magnetic fields in the same direction in all of the coils 232. Further, an attraction force may be applied from the coil 232 in one direction and a repulsive force may be applied from the coil 232 in the other direction to the magnetic body 222 magnetized in the left and right direction by the magnetic fields formed around the adjacent coils 232. Thus, the vibrator 22 may move in one direction along the longitudinal direction of the housing 21.

Thereafter, the controller 16 changes directions of the repulsive force and the attraction force applied to the magnetic body 222 by forming magnetic fields in a different direction than before to all the coils 232. Thus, the vibrator 22 may move in the other direction along the longitudinal direction of the housing 21. As the above processes are repeated, the vibrator 22 may perform a reciprocating motion along the longitudinal direction of the housing 21.

Figure 9:
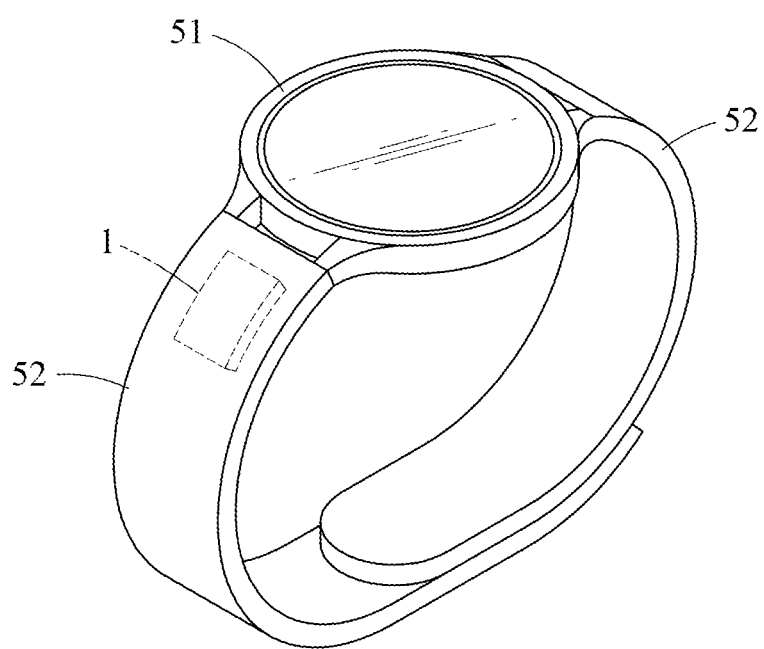
FIG. 9 is a perspective view illustrating a wearable device according to one example embodiment.

FIG. 9 is a perspective view illustrating a wearable device according to one example embodiment.

Referring to FIG. 9, a wearable device 5 according to an example embodiment may be a device, for example, a watch, a bracelet, an anklet, a ring, a belt, a necklace, or the like worn on a curved portion of a human body.

For example, the wearable device 5 may include a main body 51, a strap 52, and the curved haptic actuator 1.

The main body 51 may be a device including a display.

The strap 52 may be connected from one side of the main body 51, and at least a portion of the strap 52 may be worn on the curved portion of the human body. For example, at least the portion of the strap 52 may have a curved shape based on the curved shape of the human body.

For example, the strap 52 may be formed to be connected from one side of the main body 51 and to surround at least a portion of the human body, and be connected to the other side of the main body 51. For example, the strap 52 may be formed of two members that are respectively connected to both sides of the main body 51 and are able to be coupled to each other.

For example, the strap 52 may be formed of the two straps 52 respectively connected to the both sides of the main body 51 formed as the watch as shown in FIG. 9.

The curved haptic actuator 1 may be installed in the curved portion of the strap 52. For example, the curved haptic actuator 1 may be installed inside the curved portion of the strap 52.

Based on the above structure, inside the curved portion of the strap 52, the curved haptic actuator 1 may be disposed to match the curved shape of the strap 52, so that the curved haptic actuator 1 may be compactly disposed inside the strap 52.

In addition, the housing 11 and the vibrator 12 may be designed to be larger in size compared to a flat type actuator, thereby generating a better vibration force.

Based on the curved haptic actuator 1, a motion may be generated in a longitudinal direction of the strap 52. Because the motion generated in the longitudinal direction of the strap 52 may be transmitted along the strap 52 and the main body 51, a tactile sensation generated by the motion may be transmitted more effectively through an entirety of the wearable device 5 compared to other actuators that vibrate inside the strap 52 in a direction perpendicular to the longitudinal direction of the strap 52.

For example, the curved haptic actuator 1 may be installed in a form in which the housing 11 and the strap 52 are integrated. In other words, the receiving space 111 is defined inside the strap 52, so that the curved haptic actuator 1 may be disposed in the receiving space 111 without the housing 11.

In one example, the first curved haptic actuator 1 and the second curved haptic actuator 1 may be respectively positioned in the first strap 52 and the second strap 52 respectively connected to the both sides of the main body 51. Further, the first curved haptic actuator 1 and the second curved haptic actuator 1 may have structures and arrangements that are symmetrical with respect to the main body 51. In this state, when the same voltage is applied to the pair of curved haptic actuators 1, a pair of vibrators 12, which are respectively disposed in the pair of curved haptic actuators 1, may move toward the main body 51 at the same time or move to be farther away from the main body 51 at the same time, respectively along the longitudinal directions of the pair of straps 52. Such movement of the vibrator 12 may result in moving the main body 51 in a direction to be farther away from the user (in an upward direction) or in a direction of pulling the main body 51 towards the user (in a downward direction). As a result, the user may recognize a specific event using a tactile sense transmitted from the main body 51 to the user.

Figure 10:
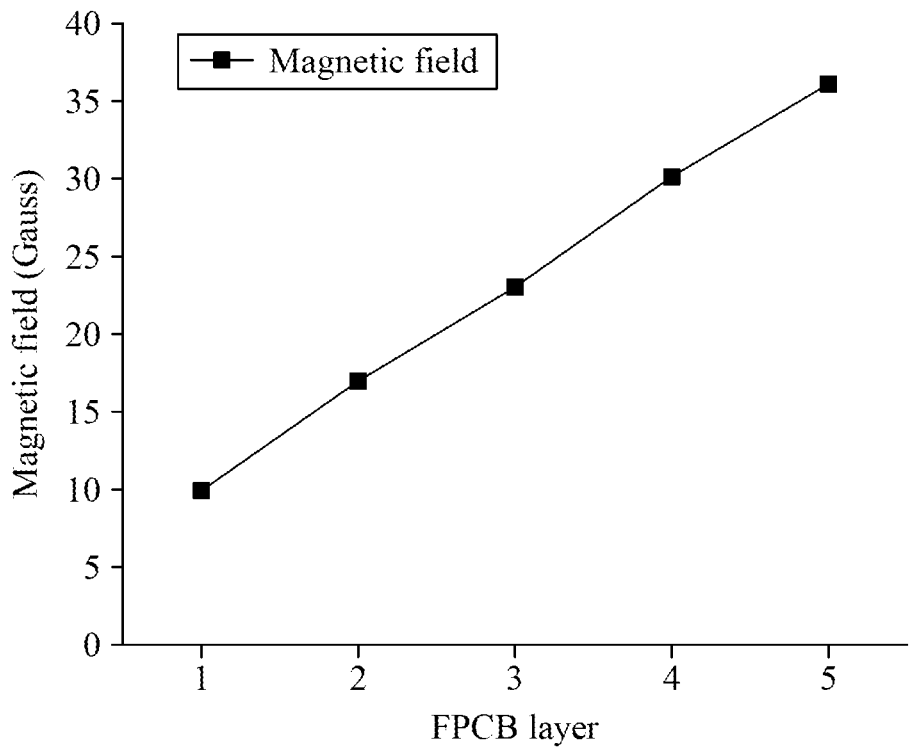
FIG. 10 is a graph illustrating an intensity of a magnetic field based on the number of layers of a flexible printed circuit board.

FIG. 10 is a graph illustrating an intensity of a magnetic field based on the number of layers of a flexible printed circuit board.

Referring to FIG. 10, when the magnetic field generator 13 is formed of the flexible printed circuit board having the multilayer structure, an intensity of the magnetic field generated by the magnetic field generator 13 may be identified based on a change in the number of layers of the flexible printed circuit board.

Based on FIG. 10, as the number of layers of the flexible printed circuit board increases, the intensity of the magnetic field generated by the magnetic field generator 13 also increases linearly.

Figure 11:
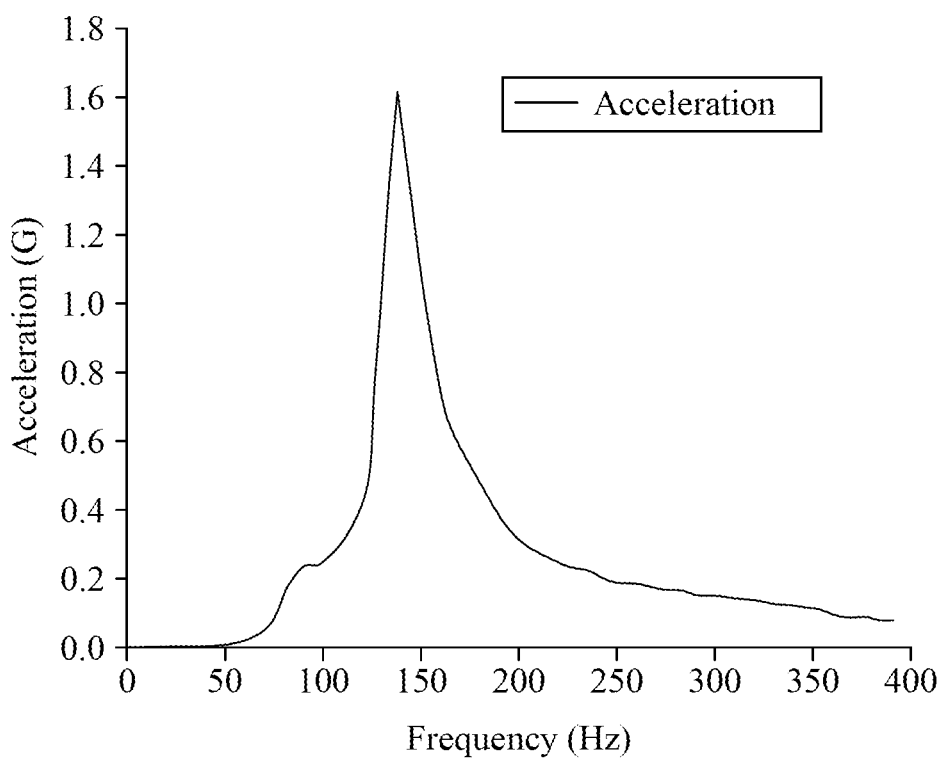
FIG. 11 is a graph measuring a vibration force that varies depending on a frequency applied to a curved haptic actuator according to one example embodiment.

FIG. 11 is a graph measuring a vibration force that varies depending on a frequency applied to a curved haptic actuator according to one example embodiment.

As a result of a measurement through an experiment, it was measured that a magnitude of the vibration force that may be sensed by the human using the tactile sensation is equal to or greater than 0.2 G. Referring to FIG. 11, it may be seen that a frequency band in which a vibration force of equal to or greater than 0.2 G is generated in the curved haptic actuator 1 according to an example embodiment is between 80 Hz and 250 Hz.

According to the above result, it may be seen that the curved haptic actuator 1 of an example embodiment has a wide driving frequency band between 80 Hz and 250 Hz.

Figure 12:
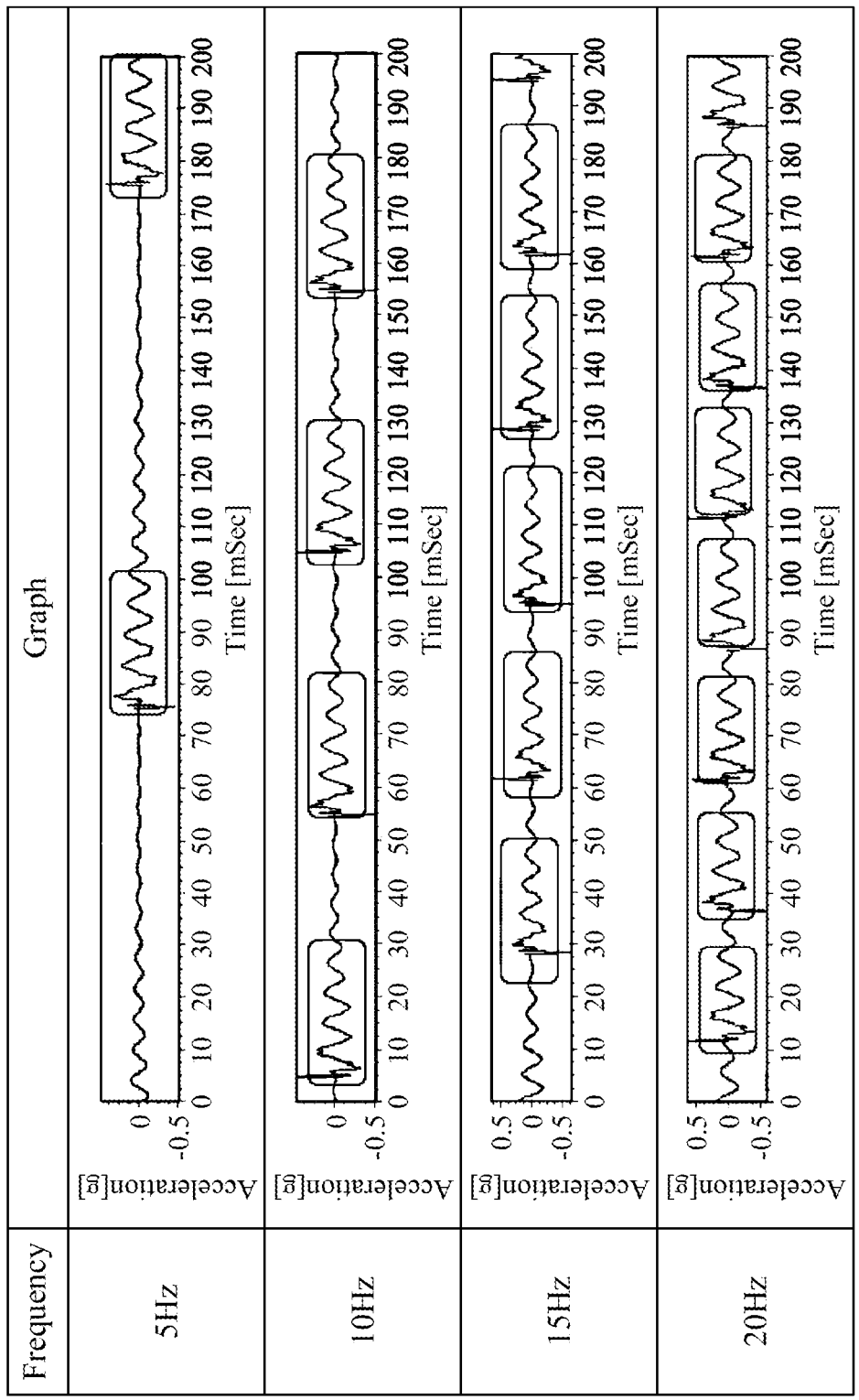
FIG. 12 is a graph measuring a vibration force measured when a square-wave of a low frequency is applied to a curved haptic actuator according to one example embodiment.

FIG. 12 is a graph measuring a vibration force measured when a square-wave of a low frequency is applied to a curved haptic actuator according to one example embodiment.

Specifically, FIG. 12 is a graph illustrating square-waves of 5, 10, 15, and 20 Hz in a band less than a low frequency (20 Hz) input in the curved haptic actuator 1 according to an exemplary embodiment (A mass of a mass body used in an experiment is 2.71 g, a spring constant of an elastic member is 0.1072 N/m, and a magnitude of an applied voltage is 3 V).

Based on a book "Robotic Tactile Sensing Technologies and System, Springer" on artificial tactile sensing, a minimum time (resolution over time) to distinguish two stimuli at a fingertip is known to be 30 to 50 ms. This indicates that a vibration felt at the fingertip from 0 seconds at which the square-wave is input to 30 ms is recognized as one vibration.

Therefore, in a case of 20 Hz, intervals between the highest points of an absolute acceleration value are narrowly distributed within 30 ms within one period of the square-wave. Even when the square-wave is input, the square-wave is perceived as the general vibration like the sine wave and is recognized as one vibration, so that it is difficult to perceive the tactile sensation corresponding to the tapping.

On the other hand, when the square-waves of 5, 10, and 15 Hz are input, because the intervals between the highest points of the absolute acceleration value within one period of the square-wave are formed to be 30 ms or greater, the user may perceive the tactile sensation corresponding to the tapping, which is different from the general vibration.

Therefore, when the driving mode is the tapping mode, the controller 16 may apply a square-wave having a frequency of 1 Hz or greater and 15 Hz or below to the magnetic field generator 13.

Figure 13:
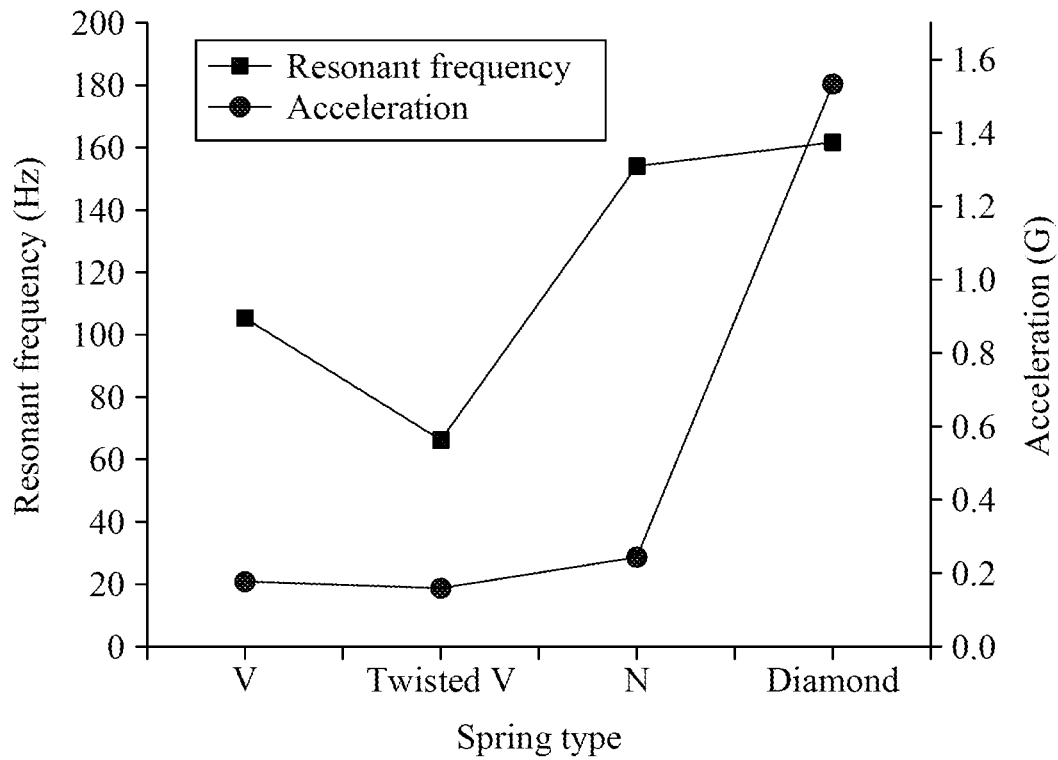
FIG. 13 is a graph illustrating a resonant frequency and a vibration force measured by varying a shape of an elastic body in a curved haptic actuator according to one example embodiment.

FIG. 13 is a graph illustrating a resonant frequency and a vibration force measured by varying a shape of an elastic body in a curved haptic actuator according to one example embodiment.

Specifically, FIG. 13 is a graph measuring vibration forces of the elastic body while changing the shape of the elastic body to the 'V' shape, twisted 'V' shape, 'N' shape, and the diamond or the rhombus shape.

Referring to FIG. 13, it may be seen than, when using the elastic body of the diamond or the rhombus shape, the vibration force is measured to be the highest.

Because the elastic body 14 has different characteristics depending on the shape of the elastic body 14, an elastic body of a form having a specification suitable for each application may be used.

Figure 14:
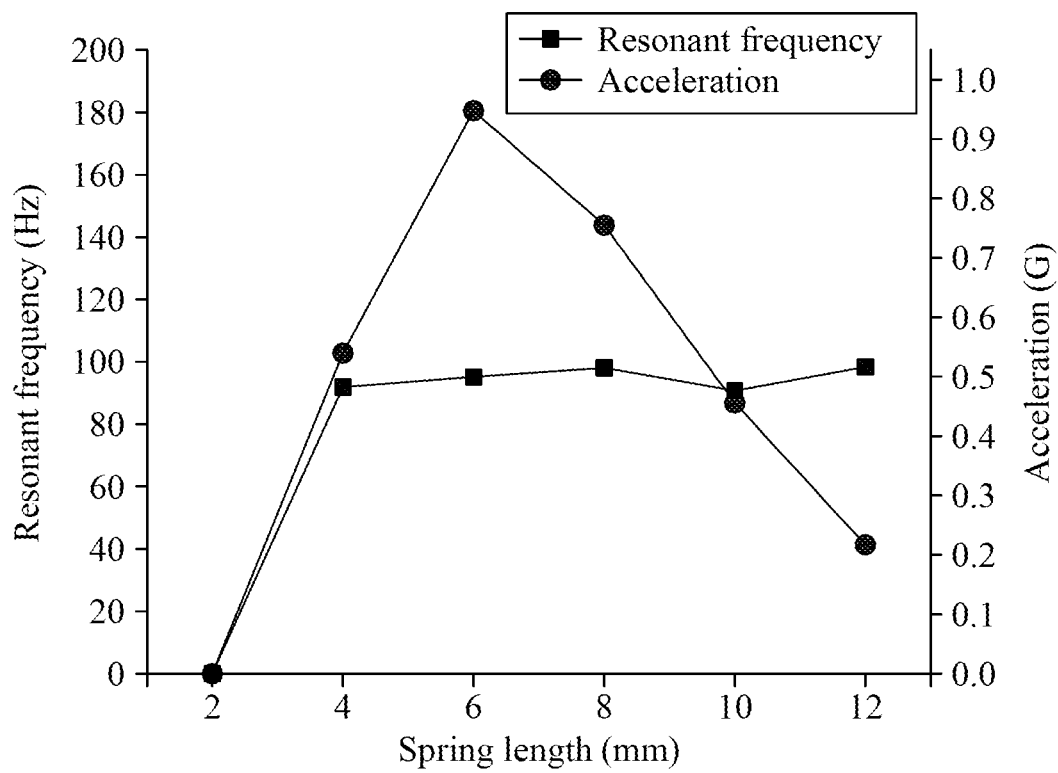
FIG. 14 is a graph illustrating a resonant frequency and a vibration force measured by varying a foot length of an elastic body in a curved haptic actuator according to one example embodiment.

FIG. 14 is a graph illustrating a resonant frequency and a vibration force measured by varying a foot length of an elastic body in a curved haptic actuator according to one example embodiment.

Referring to FIG. 14, it may be seen that, when the foot length h of the elastic body 14 is equal to or less than 2 mm, the vibration does not occur. When the foot length h is equal to or greater than 12 mm, a magnitude of the vibration force is small and a rolling phenomenon in which the vibrator 12 moves in the up and down direction occurs, so that a lot of noise may be occurred.

Therefore, the foot length h of the elastic body 14, that is, a width in the up and down direction of the elastic body 14 may be 4 mm to 10 mm to form a sufficient vibration force while solving the noise occurrence problem.

Figure 15:
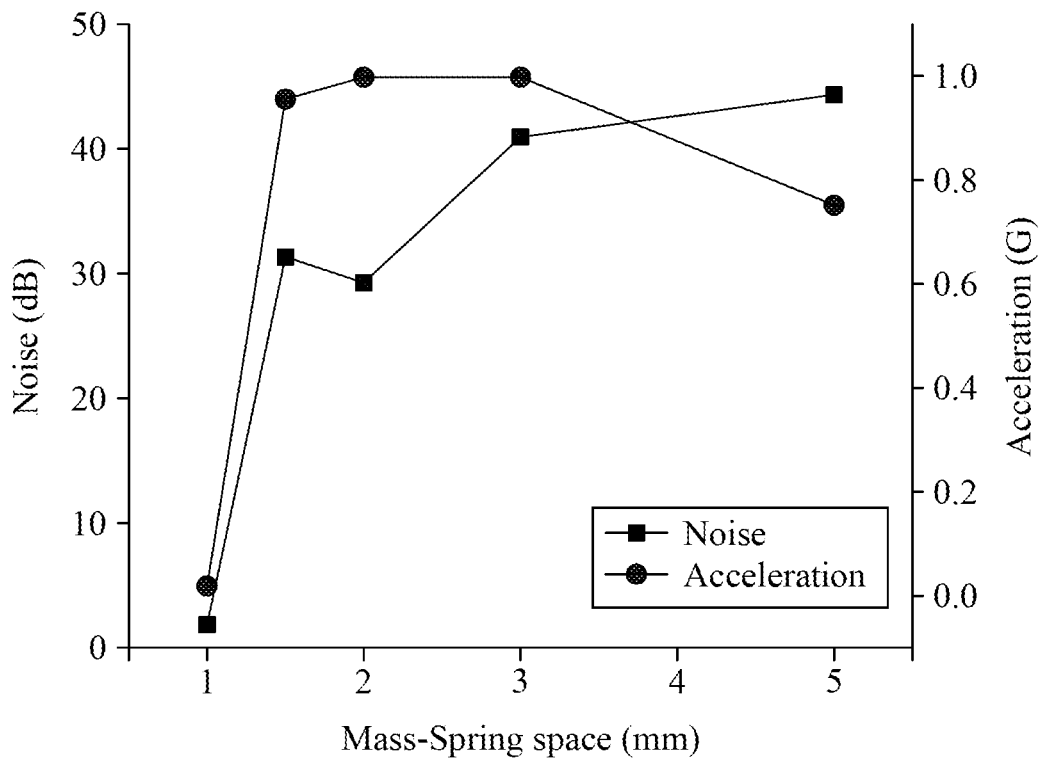
FIG. 15 is a graph illustrating a noise and a vibration force measured by varying a spacing between a vibrator and an inner wall of a housing in a curved haptic actuator according to one example embodiment.

FIG. 15 is a graph illustrating a noise and a vibration force measured by varying a spacing between a vibrator and an inner wall of a housing in a curved haptic actuator according to one example embodiment.

Referring to FIG. 15, it may be seen that, when a spacing between the vibrator 12 and the inner wall of the housing 11 is equal to or greater than 3 mm, the vibration force decreases. Further, in this case, the rolling phenomenon occurs in the vibrator 12 and the vibrator 12 moves in the up and down direction of the housing 11 rather than the longitudinal direction of the housing 11, so that the noise may occur severely.

Thus, it may be seen that, when the spacing between the vibrator 12 and the inner wall of the housing 11 is between 1.5 mm and 2.0 mm, less noise occurs while maintaining a large vibration force.

Accordingly, a distance between each of the both side surfaces of the vibrator 12 and each of the left and right side surfaces of the receiving space 111 may be between 1.5 mm and 2.0 mm.

Figure 16:
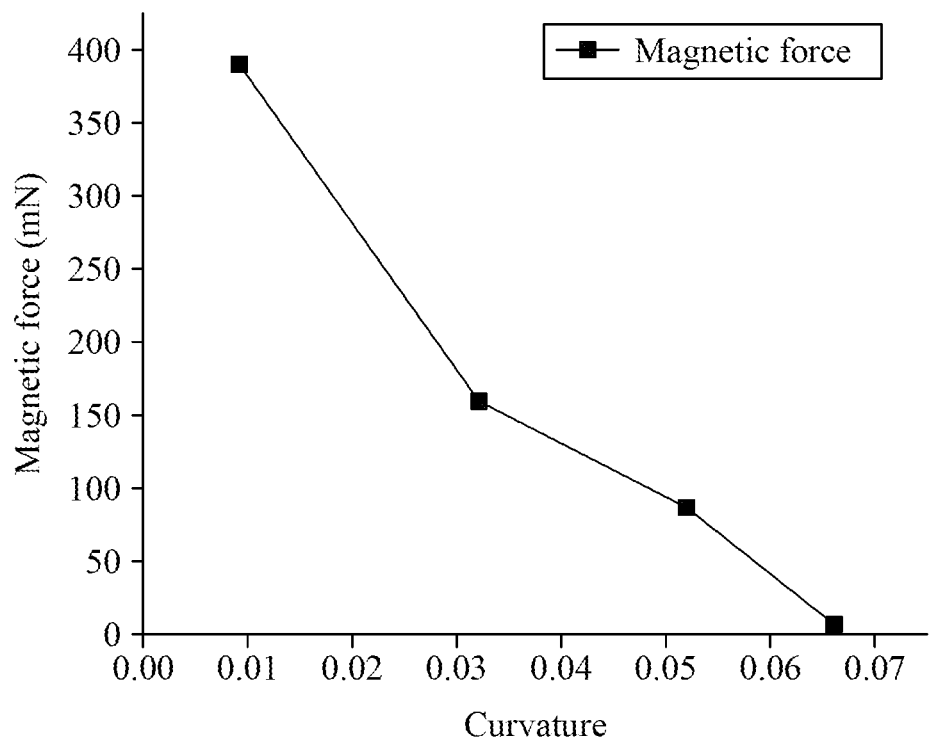
FIG. 16 is a graph illustrating a magnetic force measured by varying a curvature of a housing and a vibrator in a curved haptic actuator according to one example embodiment.

FIG. 16 is a graph illustrating a magnetic force measured by varying a curvature of a housing and a vibrator in a curved haptic actuator according to one example embodiment.

Referring to FIG. 16, it may be seen that as the curvature of the housing 11 and the vibrator 12 increases, a magnetic force generated by the magnetic field generator 13 decreases. When the magnetic force is too weak, the vibrator 12 will not generate enough vibration force, so that the curvature needs to be equal to or less than 0.066 for great magnetic force.

For example, when the minimum vibration force that the human may perceive is 0.2 G as described above, this may be 1.96 m/s^2 when converted into acceleration, and this may be 5.3116 mN when being multiplied by a mass of the curved haptic actuator 1 and represented as a magnitude of a force N.

Therefore, based on FIG. 16, a maximum curvature of the vibrator 12 and the housing 11 may not exceed 0.066 to generate the vibration force greater than 5.3116 mN.

Thus, the set curvature of the housing 11 and the vibrator 12 may be formed in a range of 0.01 to 0.066.

Figure 17:
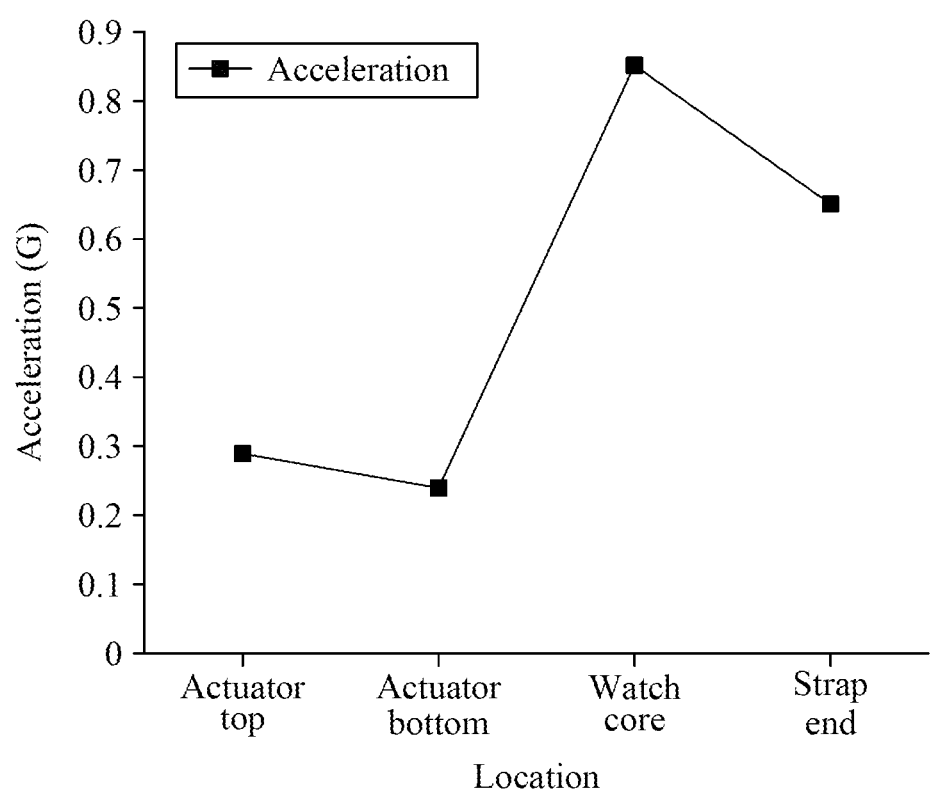
FIG. 17 is a graph illustrating a vibration force measured for each position in a wearable device according to one example embodiment.

FIG. 17 is a graph illustrating a vibration force measured for each position in a wearable device according to one example embodiment.

Referring to FIG. 17, a magnitude of the vibration force generated in the curved haptic actuator 1 depending on a position of the wearable device 5 may be identified.

Specifically, FIG. 17 is a result of measuring vibration forces at four positions of above the strap 52 and below the strap 52 in a vertical direction of a portion to which the curved haptic actuator 1 is attached, a watch core, and an end of the strap 52 to which the main body 51 and the curved haptic actuator 1 are mounted.

Referring to FIG. 17, the greatest vibration force is measured at the watch core, that is, the main body 51, and the vibration may be perceived most at the main body 51 when the wearable device is actually worn.

Because the vibration direction of the curved haptic actuator 1 is the left and right direction, that is, the longitudinal direction of the strap 52, the vibration force may be transmitted to the end of the strap 52 and to the main body 51. In addition, because a mass of the main body 51 is greater than those of other portions, a wearer may perceive the vibration the most at the main body 51.

The example embodiment described above is merely to describe a preferred example embodiment of the present invention, and the scope of the present invention is not limited to the described example embodiment. Various changes, modifications, or substitutions may be made by those skilled in the art within the spirit and claims of the present invention, and such example embodiments should be regarded as falling within the scope of the present invention.

What is claimed is:

1. A strap curved to wrap around at least a portion of a human body, the strap comprising:
   a curved haptic actuator installed in at least a part of the strap,
   wherein the curved haptic actuator comprises:
      a housing having a receiving space defined in the housing, the receiving space and an outer shape of the housing being curved;
      a vibrator disposed in the receiving space, having a curved shape in a same direction as a curved direction of the housing, and movable along the curved direction of the housing;
      a magnetic field generator installed on an inner wall of the housing and generating a magnetic field and applying the generated magnetic field to the vibrator; and
      an input unit configured to receive an input signal from an outside for driving the vibrator so that the curved haptic actuator transmits a vibration along the curved direction of the strap,
      wherein a distance between the vibrator and the inner wall of the housing closest to the vibrator is less than 3 mm and greater than 0.

2. The strap of claim 1,
   wherein a stronger vibration is transmitted at both ends in the curved direction of the strap than at an upper or a lower portion of the strap in a direction orthogonal to a portion where the curved haptic actuator is installed.

3. The strap of claim 1, further comprising:
   an elastic body connecting the inner wall of the housing with the vibrator.

4. The strap of claim 1,
   wherein the vibrator moves such that the vibrator does not come into contact with the inner wall of the housing.

5. The strap of claim 1,
   wherein the vibrator comprises:
      a mass body; and
      a magnetic material.

6. The strap of claim 1,
   wherein the magnetic field generator comprises:
      a substrate curved in a same curvature as the housing; and
      a plurality of coils arranged in the substrate to be spaced apart from each other along the curved direction of the housing.

7. The strap of claim 1,
   wherein a value of the curvature of the housing ranges from 0.01 to 0.066.

8. The strap of claim 1,
   wherein at least a portion of the elastic body is bent.

9. The strap of claim 1,
   wherein the curved haptic actuator is operable in a plurality of driving modes, provides the vibration in a first driving mode, and provides tapping in a second driving mode.

10. A device comprising:
a main body, at least a portion of the main body being a curved portion; and
a first curved haptic actuator,
wherein the first curved haptic actuator comprises:
 a first housing having a first receiving space defined in the first housing, the first receiving space and an outer shape of the first housing being curved;
 a first vibrator disposed in the first receiving space, having a curved shape in a same direction as a curved direction of the first housing, and movable along the curved direction of the first housing;
 a first magnetic field generator installed on an inner wall of the first housing and generating a first magnetic field and applying the generated first magnetic field to the first vibrator; and
 a first input unit configured to receive an input signal from an outside for driving the first vibrator,
wherein the first curved haptic actuator is installed on the curved portion of the main body, and
wherein the first input unit receives the input signal so that the first curved haptic actuator transmits a vibration along a curved direction of the curved portion of the main body,
wherein a distance between the first vibrator and the inner wall of the first housing closest to the first vibrator is less than 3 mm and greater than 0.

11. The device of claim 10, further comprising:
a second curved haptic actuator,
wherein the second curved haptic actuator comprises:
 a second housing having a second receiving space defined in the second housing, the second receiving space and an outer shape of the second housing being curved;
 a second vibrator disposed in the second receiving space;
 a second magnetic field generator installed on an inner wall of the second housing and generating a second magnetic field and applying the generated second magnetic field to the second vibrator; and
 a second input unit configured to receive an input signal from the outside for driving the second vibrator,
wherein the second curved haptic actuator is installed on the curved portion of the main body.

12. The device of claim 11,
wherein the second curved haptic actuator has a shape or disposition symmetrical to the first curved haptic actuator with respect to a point of the main body.

13. The device of claim 11, further comprising:
a controller configured to respectively apply a voltage having the same magnitude to the first curved haptic actuator and the second curved haptic actuator.

* * * * *